US012391549B2

(12) United States Patent
Kan

(10) Patent No.: US 12,391,549 B2
(45) Date of Patent: Aug. 19, 2025

(54) METHOD FOR PREPARING ELECTRONIC GRADE INORGANIC ACIDS FROM WASTE ACID SOLUTION

(71) Applicants: GREEN FINE TECHNOLOGY CORP., Taoyuan (TW); GREEN ADVANCED TECHNOLOGY LTD., Taoyuan (TW)

(72) Inventor: Ching-Jung Kan, Taoyuan (TW)

(73) Assignees: GREEN FINE TECHNOLOGY CORP., Taoyuan (TW); GREEN ADVANCED TECHNOLOGY LTD., Taoyuan (TW)

( * ) Notice: Subject to any disclaimer, the term of this patent is extended or adjusted under 35 U.S.C. 154(b) by 591 days.

(21) Appl. No.: 17/944,530

(22) Filed: Sep. 14, 2022

(65) Prior Publication Data

US 2023/0118652 A1 Apr. 20, 2023

(30) Foreign Application Priority Data

Oct. 18, 2021 (TW) .................................. 110138489

(51) Int. Cl.
*C01B 7/19* (2006.01)
*B01D 3/10* (2006.01)
*B01D 3/14* (2006.01)
*B01D 3/36* (2006.01)
*B01D 5/00* (2006.01)
*C01B 21/46* (2006.01)

(52) U.S. Cl.
CPC ................ *C01B 7/196* (2013.01); *B01D 3/10* (2013.01); *B01D 3/148* (2013.01); *B01D 3/36* (2013.01); *B01D 5/006* (2013.01); *C01B 21/46* (2013.01); *C01P 2006/80* (2013.01)

(58) Field of Classification Search
None
See application file for complete search history.

(56) References Cited

U.S. PATENT DOCUMENTS

| | | | | | |
|---|---|---|---|---|---|
| 2,047,201 | A | * | 7/1936 | Gollwitzer | B41L 47/18 101/57 |
| 3,106,515 | A | * | 10/1963 | Williams | C01B 21/44 203/84 |
| 3,647,376 | A | * | 3/1972 | Ohrui | C01B 21/44 423/394.2 |
| 3,725,536 | A | * | 4/1973 | Gentili | C01B 7/191 95/233 |
| 3,919,399 | A | * | 11/1975 | Schabacher | C01B 7/191 423/240 R |
| 6,214,173 | B1 | * | 4/2001 | Xu | B01D 3/143 202/180 |
| 7,988,942 | B2 | * | 8/2011 | Walter | B01D 3/148 423/523 |

* cited by examiner

*Primary Examiner* — John J Figueroa
(74) *Attorney, Agent, or Firm* — HSML P.C.

(57) ABSTRACT

A method for preparing electronic grade inorganic acids includes: introducing alkali metal salts into a waste acid solution containing hydrofluoric acid, nitric acid and water to obtain hydrogen fluoride vapor, and a distillation residue mixture containing nitric acid, water and the alkali metal salts; subjecting the first distillation residue mixture to evaporation treatment, and then introducing an alkali earth metal nitrate salt into the resultant nitric acid/water mixture followed by distillation treatment so as to obtain nitric acid vapor; and removing mist droplets in the hydrogen fluoride and nitric acid vapor, followed by condensation treatment and concentration adjustment so as to obtain electronic grade hydrofluoric acid and nitric acid.

11 Claims, No Drawings

METHOD FOR PREPARING ELECTRONIC GRADE INORGANIC ACIDS FROM WASTE ACID SOLUTION

CROSS-REFERENCE TO RELATED APPLICATION

This application claims priority of Taiwanese Invention Patent Application No. 110138489, filed on Oct. 18, 2021.

FIELD

The present disclosure relates to a method for preparing inorganic acids from a waste acid solution, and more particularly to a method for preparing electronic grade inorganic acids from the waste acid solution.

BACKGROUND

At present, in the manufacturing process of semiconductors and solar cells of the high-tech electronics industry, a large amount of hydrofluoric acid or a mixture containing hydrofluoric acid and nitric acid is used for cleaning and etching silicon and silicon-based compounds, resulting in production of a large amount of a waste acid solution which contains hydrofluoric acid and water, or even nitric acid. The waste acid solution, if discharged directly without proper treatment, would cause waste of resources, and serious pollution and harm to the environment. In particular, use of hydrofluoric acid and nitric acid has increased with vigorous development of the semiconductor industry, which leads to exacerbation of production of a large amount of the waste acid solution. Therefore, how to effectively treat the waste acid solution in the electronics industry, in particular the waste acid solution containing hydrofluoric acid, nitric acid and water, is an important issue that needs to be urgently solved.

However, in the waste acid solution, since a binary azeotrope between hydrofluoric acid and water, or between nitric acid and water, and a trinary azeotrope between hydrofluoric acid, nitric acid and water are easy to form, the existing methods for treating the waste acid solution in the electronics industry, such as use of sulfuric acid, vacuum evaporation, ion exchange, solvent extraction, electrodialysis, etc., cannot effectively separate hydrofluoric acid and nitric acid from the waste acid solution, and more so, hydrofluoric acid with high purity and nitric acid with high purity cannot be regenerated from the waste acid solution, and thus, the application and economic benefits of the recovered acids are limited.

SUMMARY

Therefore, an object of the present disclosure is to provide a method for preparing electronic grade inorganic acids from a waste acid solution containing hydrofluoric acid, nitric acid and water, which can alleviate the drawbacks of the prior art.

According to the present disclosure, the method for preparing electronic grade inorganic acids includes the following steps (A) to (H):

In step (A), alkali metal salts containing an alkali metal fluoride salt and an alkali metal nitrate salt are introduced into the waste acid solution to break azeotrope of hydrofluoric acid and water, the alkali metal salts being present in a molar amount ranging from 20 mol % to 40 mol % based on a total molar amount of the alkali metal salts, hydrofluoric acid, nitric acid and water of the waste acid solution, and then a first distillation treatment is performed in a vacuum environment to obtain a hydrogen fluoride vapor that is entrained with mist droplets containing impurities, and a first distillation residue mixture containing nitric acid, water, the alkali metal fluoride salt and the alkali metal nitrate salt. The alkali metal fluoride salt is selected from the group consisting of lithium fluoride, potassium fluoride, cesium fluoride, and combinations thereof. The alkali metal nitrate salt is selected from the group consisting of lithium nitrate, potassium nitrate, cesium nitrate, and combinations thereof. A molar ratio of the alkali metal fluoride salt to the alkali metal nitrate salt ranges from 0.05:1 to 10:1. The vacuum environment has a pressure ranging from 100 mmHg to 500 mmHg. The first distillation treatment is performed in a first distillation tower that includes a polytetrafluoroethylene lining, a bottom portion set at a temperature ranging from 80° C. to 130° C., and a top portion opposite to the bottom portion and set at a temperature ranging from 50° C. to 100° C.

In step (B), the mist droplets containing impurities entrained in the hydrogen fluoride vapor are removed so as to obtain a purified hydrogen fluoride vapor.

In step (C), the purified hydrogen fluoride vapor is subjected to a first condensation treatment, followed by concentration adjustment using ultrapure water so as to obtain an electronic grade hydrofluoric acid having a purity of 49±0.5%.

In step (D), the first distillation residue mixture obtained in step (A) is subjected to a first evaporation treatment in a vacuum environment, such that partial water and nitric acid are evaporated therefrom to form a nitric acid/water mixture, and such that the alkali metal fluoride salt, the alkali metal nitrate salt, and yet-to-be evaporated water are concentrated to form a concentrated solution of the alkali metal salts which is then subjected back to the first distillation treatment of step (A) so as to be recycled.

In step (E), an alkali earth metal nitrate salt is introduced into the nitric acid/water mixture obtained in step (D) so as to break azeotrope of nitric acid and water, and then a second distillation treatment is performed in a vacuum environment to obtain a nitric acid vapor that is entrained with mist droplets containing impurities, and a second distillation residue that is an alkali earth metal nitrate solution containing the alkali earth metal nitrate salt and water.

In step (F), the mist droplets containing impurities entrained in the nitric acid vapor are removed so as to obtain a purified nitric acid vapor.

In step (G), the purified nitric acid vapor is subjected to a second condensation treatment, followed by concentration adjustment using ultrapure water so as to obtain an electronic grade nitric acid having a purity of 70±0.5%.

In step (H), the alkali earth metal nitrate solution obtained in step (E) is subjected to a second evaporation treatment, such that partial water is evaporated therefrom to form a concentrated alkali earth metal nitrate solution which is then subjected back to the second distillation treatment of step (E) so as to be recycled.

Another object of the present disclosure is to provide a method for preparing an electronic grade hydrofluoric acid from a waste hydrofluoric acid solution containing water and hydrofluoric acid, which can alleviate the drawbacks of the prior art.

According to the present disclosure, the method for preparing the electronic grade hydrofluoric acid includes the following steps (A) to (C).

In step (A), alkali metal salts containing an alkali metal fluoride salt and an alkali metal nitrate salt are introduced into the waste hydrofluoric acid solution to break azeotrope of hydrofluoric acid and water, the alkali metal salts being present in a molar amount ranging from 20 mol % to 40 mol % based on a total molar amount of the alkali metal salts, hydrofluoric acid and water in the waste hydrofluoric acid solution, and then a distillation treatment is performed in a vacuum environment to obtain a hydrogen fluoride vapor that is entrained with mist droplets containing impurities. The alkali metal fluoride salt is selected from the group consisting of lithium fluoride, potassium fluoride, cesium fluoride, and combinations thereof. The alkali metal nitrate salt is selected from the group consisting of lithium nitrate, potassium nitrate, cesium nitrate, and combinations thereof. A molar ratio of the alkali metal fluoride salt to the alkali metal nitrate salt ranges from 0.05:1 to 10:1. The vacuum environment has a pressure ranging from 100 mmHg to 500 mmHg. The distillation treatment is performed in a distillation tower that includes a polytetrafluoroethylene lining, a bottom portion set at a temperature ranging from 80° C. to 130° C., and a top portion opposite to the bottom portion and set at a temperature ranging from 50° C. to 100° C.

In step (B), the mist droplets containing impurities entrained in the hydrogen fluoride vapor are removed so as to obtain a purified hydrogen fluoride vapor.

In step (C), the purified hydrogen fluoride vapor is subjected to a condensation treatment, followed by concentration adjustment using ultrapure water so as to obtain an electronic grade hydrofluoric acid having a purity of 49±0.5%.

DETAILED DESCRIPTION

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which this disclosure belongs. One skilled in the art will recognize many methods and materials similar or equivalent to those described herein, which could be used in the practice of this disclosure. Indeed, this disclosure is in no way limited to the methods and materials described.

As used herein, the term "waste acid solution" generally refers to a waste hydrofluoric acid solution which contains hydrofluoric acid [$HF_{(aq)}$] and water and which is produced in the manufacturing process of products applied in high-technology electronics industry, such as semiconductor industry, optoelectronics industry, etc. Depending on the manufacturing process of the desired products, the thus produced waste acid solution may further include at least one of nitric acid [$HNO_{3(aq)}$] and fluorosilicic acid ($H_2SiF_6$). For example, the waste acid solution produced in the cleaning process of a silicon wafer may contain water, about 5 wt % to about 35 wt % of hydrofluoric acid, and about 0.1 wt % to about 5 wt % of fluorosilicic acid. The waste acid solution produced in the etching process of a polysilicon wafer may contain water, about 5 wt % to about 35 wt % of hydrofluoric acid, about 0.1 wt % to about 10 wt % of fluorosilicic acid, and about 10 wt % to about 55 wt % of nitric acid.

According to this disclosure, when the waste hydrofluoric acid solution containing hydrofluoric acid and water is to be treated, a method of the present disclosure is capable of separating and recovering the hydrofluoric acid from the waste hydrofluoric acid solution so as to regenerate an electronic grade hydrofluoric acid having a high purity. When the waste acid solution containing hydrofluoric acid, nitric acid and water is to be treated, another method of the present disclosure is capable of individually separating and recovering the hydrofluoric acid and the nitric acid from the waste acid solution so as to regenerate an electronic grade hydrofluoric acid and an electronic grade nitric acid, each having a high purity. The abovementioned methods will be described in details in two embodiments below.

First Embodiment

In a first embodiment, a method for preparing electronic grade inorganic acids from a waste acid solution containing hydrofluoric acid, nitric acid and water is provided and includes the following consecutive steps (A) to (H).

In step (A), alkali metal salts containing an alkali metal fluoride salt and an alkali metal nitrate salt are introduced into the waste acid solution to break azeotrope of hydrofluoric acid and water, and then a first distillation treatment is performed in a vacuum environment to obtain a hydrogen fluoride vapor [$HF_{(g)}$] that is entrained with mist droplets containing impurities, and a first distillation residue mixture that contains nitric acid, water, the alkali metal fluoride salt, and the alkali metal nitrate salt.

The azeotrope formed between the hydrofluoric acid and water can be broken by adding the alkali metal salts, so as to separate hydrofluoric acid and water. In addition, in comparison with using the alkali metal fluoride salt alone or the alkali metal nitrate salt alone, use of a mixture of the alkali metal fluoride salt and the alkali metal nitrate salt is more effective for breaking azeotrope of hydrofluoric acid and water in the waste acid solution. It should be noted that, by controlling the added amounts of the alkali metal salts to break azeotrope of hydrofluoric acid and water, although the alkali metal salts alter the gas-liquid balance of nitric acid and water to shift the azeotrope point thereof, azeotrope formed between nitric acid and water is not broken, such that nitric acid vapor may not be separated out during the first distillation treatment. Therefore, in step (A), the hydrogen fluoride vapor may be separated out alone. To be specific, the alkali metal salts may be present in a molar amount ranging from 20 mol % to 40 mol % based on a total molar amount of the alkali metal salts, hydrofluoric acid, nitric acid and water of the waste acid solution. It should be noted that when the alkali metal salts are present in an amount of greater than 20 mol %, azeotrope of hydrofluoric acid and water can be broken and a great amount of hydrogen fluoride vapor may be separated out, resulting in a high recovery rate of hydrofluoric acid; and that when the alkali metal salts are present in an amount of not greater than 40 mol %, azeotrope formed between nitric acid and water may not be broken and thus separation of nitric acid vapor entrained in the hydrogen fluoride vapor to be separated-out may be effectively or even completely avoided. In addition, the alkali metal fluoride salt and the alkali metal nitrate salt have high saturation solubility, and crystal precipitation does not occur easily. Examples of the alkali metal fluoride salt may include, but are not limited to, lithium fluoride, potassium fluoride, cesium fluoride, and combinations thereof. Examples of the alkali metal nitrate salt may include, but are not limited to, lithium nitrate, potassium nitrate, cesium nitrate, and combinations thereof. In certain embodiments, a molar ratio of the alkali metal fluoride salt to the alkali metal nitrate salt ranges from 0.05:1 to 10:1, which is conducive not only to a high recovery rate of hydrofluoric acid (up to greater than 99%) and a high recovery rate of nitric acid (up to greater than 95%), but also to high purity of the electronic grade hydrofluoric acid (with deceased content of nitric acid) and electronic grade nitric acid (with decreased content of the hydrofluoric acid) that are to be obtained in the following steps.

In certain embodiments, the vacuum environment for the first distillation treatment has a pressure ranging from 100 mmHg to 500 mmHg. The first distillation treatment may be performed in a first distillation tower that includes a polytetrafluoroethylene lining. The first distillation tower also includes a bottom portion set at a predetermined temperature, e.g., ranging from 80° C. to 130° C., and a top portion opposite to the bottom portion and set at a predetermined temperature, e.g., ranging from 50° C. to 100° C. In certain embodiments, a reflux ratio of the first distillation tower ranges from 0.5 to 3, so that the thus obtained hydrogen fluoride vapor has a relatively higher purity. It is worth noting that, by adding the alkali metal salts, the first distillation treatment may be conducted with the top and bottom portions of the first distillation tower being set at a relatively low temperature range, so as to save energy and reduce corrosion of the first distillation tower.

According to this disclosure, when the waste acid solution further contains fluorosilicic acid, the method for preparing electronic grade inorganic acids may further include, before step (A), a step of introducing sodium hydroxide into the waste acid solution to form sodium fluorosilicate, followed by removal of sodium fluorosilicate using filtration.

In step (B), the mist droplets containing impurities entrained in the hydrogen fluoride vapor obtained in step (A) are removed so as to obtain a purified hydrogen fluoride vapor. Such removal may be achieved by passing the hydrogen fluoride vapor through a demisting apparatus.

The demisting apparatus may include at least two demister elements connected in sequence. Each of the demister elements includes at least one filler unit which has a support frame and a filler filled in the support frame. The support frame is made of at least one material selected from the group consisting of perfluoroalkoxy vinyl ether copolymer (PFA) and modified polytetrafluoroethylene (M-PTFE). The filler is made of a material selected from the group consisting of perfluoroalkoxy vinyl ether copolymer and modified polytetrafluoroethylene. When a plurality of the filler units are included in at least one of the demister elements, the filler of each of the filler units may be made of the same or different material. In certain embodiments, the filler has a wire mesh shape or a three-dimensional honeycomb shape. The filler may have a specific surface area ranging from 200 $m^2/m^3$ to 2000 $m^2/m^3$.

In step (C), the purified hydrogen fluoride vapor obtained in step (A) is subjected to a first condensation treatment, followed by concentration adjustment using ultrapure water so as to obtain an electronic grade hydrofluoric acid having a purity of 49±0.5%.

In step (D), the first distillation residue mixture containing nitric acid, water, the alkali metal fluoride salt and the alkali metal nitrate salt obtained in step (A) was subjected to a first evaporation treatment in a vacuum environment, such that partial water and nitric acid are evaporated therefrom to form a nitric acid/water mixture, and such that the alkali metal fluoride salt, the alkali metal nitrate salt, and yet-to-be evaporated water are concentrated to form a concentrated solution of the alkali metal salts.

The first evaporation treatment may be performed in a vacuum evaporation kettle that includes a polytetrafluoroethylene lining. In certain embodiments, the first evaporation treatment is conducted at a temperature ranging from 130° C. to 180° C. When the temperature of the first evaporation treatment ranges from 130° C. to 180° C., the concentrated solution of the alkali metal salts may have a high concentration of the alkali metal salts which is beneficial for transporting the concentrated solution of the alkali metal salts in the pipelines and equipment applied in the method of this disclosure.

It should be noted that the concentrated solution of the alkali metal salts may be recovered and be subjected back to the first distillation treatment of step (A) so as to be recycled. To be specific, the concentrated solution of the alkali metal salts thus recovered from step (D) may be continuously used in the next step (A) to break azeotrope of hydrofluoric acid and water. In actual practice, since a relatively large amount of the alkali metal fluoride salt and the alkali metal nitrate salt is used, a relatively large amount of the concentrated solution of the alkali metal salts will be produced. Therefore, recovering and recycling the concentrated solution of the alkali metal salts not only avoid generation of secondary process waste, but also achieve the goals of energy-saving and environmentally friendly.

In step (E), an alkali earth metal nitrate salt is introduced into the nitric acid/water mixture obtained in step (D) so as to break azeotrope of nitric acid and water, and then a second distillation treatment is performed in a vacuum environment to obtain a nitric acid vapor [$NO_{3(g)}$] that is entrained with mist droplets containing impurities, and obtain a second distillation residue that is an alkali earth metal nitrate solution containing the alkali earth metal nitrate salt and water.

It is noted that since the nitric acid and water in the nitric acid/water mixture obtained in step (D) still have an azeotrope point, the azeotrope formed between the nitric acid and water in the nitric acid/water mixture can be broken by adding the alkali earth metal nitrate salt in step (E) to separate nitric acid and water. As a result, the nitric acid vapor and the alkali earth metal nitrate solution that contains the alkali earth metal nitrate salt and water can be obtained from the nitric acid/water mixture. Examples of the alkali earth metal nitrate salt may include, but are not limited to, magnesium nitrate, calcium nitrate, and a combination thereof. In certain embodiments, based on a total molar amount of the alkali earth metal nitrate salt, and of nitric acid and water in the nitric acid/water mixture, the alkali earth metal nitrate salt is present in an amount ranging from 40 mol % to 65 mol %. According to the present disclosure, when the alkali earth metal nitrate salt is present in an amount of not lower than 40 mol %, a great amount of nitric acid vapor may be separated out, resulting in a high recovery rate of nitric acid. On the other hand, when the alkali earth metal nitrate salt is present in an amount of not greater than 65 mol %, crystallization of the alkali earth metal nitrate salt due to high concentration, which may cause blockage of pipelines of equipment, may be avoided.

In certain embodiments, the vacuum environment for the second distillation treatment has a pressure ranging from 100 mmHg to 500 mmHg. In addition, the second distillation treatment may be performed in a second distillation tower that includes a polytetrafluoroethylene lining. The second distillation tower may also include a bottom portion set at a predetermined temperature, e.g., ranging from 120° C. to 140° C., and a top portion opposite to the bottom portion and set at a predetermined temperature, e.g., ranging from 70° C. to 100° C. In certain embodiments, a reflux ratio of the second distillation tower ranges from 0.5 to 3, such that the thus obtained nitric acid vapor has a relatively high purity.

In step (F), the mist droplets containing impurities entrained in the nitric acid vapor obtained in step (E) are removed so as to obtain a purified nitric acid vapor. Such removal may be achieved by passing the nitric acid vapor through a demisting apparatus. The demisting apparatus used in this step is the same as that described in step (B) above, and details thereof are omitted for the sake of brevity.

In step (G), the purified nitric acid vapor obtained in step (E) is subjected to a second condensation treatment, followed by concentration adjustment using ultrapure water so as to obtain an electronic grade nitric acid having a purity of 70±0.5%.

In step (H), the alkali earth metal nitrate solution obtained in step (E) is subjected to a second evaporation treatment, such that partial water is evaporated therefrom to form a concentrated alkali earth metal nitrate solution. The second evaporation treatment may be conducted at a temperature ranging from 130° C. to 180° C., and in the vacuum evaporation kettle that includes the polytetrafluoroethylene lining.

It should be noted that the concentrated alkali earth metal nitrate solution may be recovered and be subjected back to the second distillation treatment of step (E) so as to be recycled. To be specific, the concentrated alkali earth metal nitrate solution recovered from step (H) may be continuously used in the next step (E) to break azeotrope of nitric acid and water. In actual practice, since a relatively large amount of the alkali earth metal nitrate salt is used, a relatively large amount of the concentrated alkali earth metal nitrate solution will be produced. Therefore, recovering and recycling the concentrated alkali earth metal nitrate solution not only avoid generation of secondary process waste, but also achieve the goals of energy-saving and environmentally friendly.

Second Embodiment

In a second embodiment, a method for preparing an electronic grade hydrofluoric acid from a waste hydrofluoric acid solution containing water and hydrofluoric acid according to the present disclosure is provided and includes the following consecutive steps (A) to (C).

In step (A), alkali metal salts containing an alkali metal fluoride salt and an alkali metal nitrate salt are introduced into the waste hydrofluoric acid solution to break azeotrope of hydrofluoric acid and water, and then a distillation treatment is performed in a vacuum environment to obtain a hydrogen fluoride vapor that is entrained with mist droplets containing impurities, and a distillation residue mixture that contains nitric acid, water, the alkali metal fluoride salt, and the alkali metal nitrate salt.

The azeotrope formed between the hydrofluoric acid and water can be broken by adding the alkali metal salts, so as to separate hydrofluoric acid and water. In addition, in comparison with using the alkali metal fluoride salt alone or the alkali metal nitrate salt alone, use of a mixture of the alkali metal fluoride salt and the alkali metal nitrate salt is more effective for breaking azeotrope of hydrofluoric acid and water in the waste hydrofluoric acid solution. Examples of the alkali metal fluoride salt may include, but are not limited to, lithium fluoride, potassium fluoride, cesium fluoride, and combinations thereof. Examples of the alkali metal nitrate salt may include, but are not limited to, lithium nitrate, potassium nitrate, cesium nitrate, and combinations thereof.

In certain embodiments, the alkali metal salts are present in a molar amount of greater than 20 mol %, such as ranging from 20 mol % to 40 mol %, based on a total molar amount of the alkali metal salts, hydrofluoric acid and water of the waste hydrofluoric acid solution, such that a great amount of hydrogen fluoride vapor may be separated out, resulting in a high recovery rate of hydrofluoric acid. In other embodiments, a molar ratio of the alkali metal fluoride salt to the alkali metal nitrate salt ranges from 0.05:1 to 10:1, so as to achieve a high recovery rate of hydrofluoric acid.

In certain embodiments, the vacuum environment for the first distillation treatment has a pressure ranging from 100 mmHg to 500 mmHg. The distillation treatment may be performed in a distillation tower that includes a polytetrafluoroethylene lining. The distillation tower may also include a bottom portion set at a predetermined temperature, e.g., ranging from 80° C. to 130° C., and a top portion opposite to the bottom portion and set at a predetermined temperature, e.g., ranging from 50° C. to 100° C. In certain embodiments, a reflux ratio of the distillation tower ranges from 0.5 to 3, so that the thus obtained hydrogen fluoride vapor has a relatively high purity.

According to this disclosure, when the waste hydrofluoric acid solution further contains fluorosilicic acid, the method for preparing the electronic grade hydrofluoric acid may further include, before step (A), a step of introducing sodium hydroxide into the waste hydrofluoric acid solution to form sodium fluorosilicate, followed by removal of sodium fluorosilicate using filtration.

In step (B), the mist droplets containing impurities entrained in the hydrogen fluoride vapor obtained in step (A) are removed so as to obtain a purified hydrogen fluoride vapor. Such removal may be achieved by passing the hydrogen fluoride vapor through a demisting apparatus.

The demisting apparatus may include at least two demister elements connected in sequence. Each of the demister elements includes a filler unit which has a support frame and a filler filled in the support frame. The support frame is made of at least one material selected from the group consisting of perfluoroalkoxy vinyl ether copolymer (PFA) and modified polytetrafluoroethylene (M-PTFE). The filler is made of a material selected from the group consisting of perfluoroalkoxy vinyl ether copolymer and modified polytetrafluoroethylene. When a plurality of the filler units are included in at least one of the demister elements, the filler of each of the filler unit may be made of the same or different material. The filler may have a shape of a wire mesh or a shape of a three-dimensional honeycomb. The filler may have a specific surface area ranging from 200 $m^2/m^3$ to 2000 $m^2/m^3$.

In step (C), the purified hydrogen fluoride vapor is subjected to a condensation treatment, followed by concentration adjustment using ultrapure water so as to obtain an electronic grade hydrofluoric acid having a purity of 49±0.5%.

It should be noted that the distillation residue mixture obtained in step (A) may be further subjected to an evaporation treatment to increase concentration thereof, and then may be recovered to be recycled.

The present disclosure will be further described by way of the following examples. However, it should be understood that the following examples are intended solely for the purpose of illustration and should not be construed as limiting the present disclosure in practice.

EXAMPLES 1 to 3 (EX1 to EX3)

Each of the methods of EX1 and EX2 was performed by subjecting a waste acid solution to steps (A) to (H) of the first embodiment of the method for preparing electronic grade inorganic acids of the present disclosure as described in the foregoing, so as to obtain an electronic grade hydrofluoric acid and an electronic grade nitric acid. The method of EX3 was performed by subjecting a waste acid solution to steps (A) to (C) of the second embodiment of the method for preparing an electronic grade hydrofluoric acid of the present disclosure as described in the foregoing, so as to obtain an electronic grade hydrofluoric acid.

In each of the methods of EX1 to EX3, the composition and feed amount of the waste acid solution or those of the waste hydrofluoric acid solution, the equivalent ratio of sodium hydroxide to fluorosilicic acid of step (A), the recovery rate of hydrofluoric acid, and the recovery rate of nitric acid are determined as follows, and the results are shown in Table 1 below.

1. Determination of the Composition of the Waste Acid Solution or That of the Waste Hydrofluoric Acid Solution The composition of the waste acid solutions used in EX1 and EX2 and the composition of the waste hydrofluoric acid solution used in EX3 were determined using an automatic titrator (Manufacturer: Metrohm AG; Model no.: 848 Titrino plus) and an ultraviolet-visible spectrophotometer (Manufacturer: Shimadzu Corporation; Model no.: UV-2600).

2. Recovery Rates of Hydrofluoric Acid (HF) and Nitric Acid ($HNO_3$)

The recovery rates of HF and $HNO_3$ were respectively calculated using the following Equations (I) and (II):

Recovery rate of HF=(C2×V2)÷(C1×V1)×100%  (I)

in which
C1=hydrofluoric acid concentration in the waste acid solution or the waste hydrofluoric acid solution
C2=hydrofluoric acid concentration in the electronic grade hydrofluoric acid
V1=volume of the waste acid solution or the waste hydrofluoric acid solution
V2=volume of the electronic grade hydrofluoric acid Recovery rate of $HNO_3$=(C4×V4)÷(C3×V3)×100%  (II)

in which
C3=nitric acid concentration in the waste acid solution
C4=nitric acid concentration in the electronic grade nitric acid
V3=volume of the waste acid solution
V4=volume of the electronic grade nitric acid It should be noted that, the full analysis of the electronic grade hydrofluoric acid was conducted according to the procedures set forth in Semiconductor Equipment and Materials International (SEMI) C28-0618 Specification and Guide for Hydrofluoric Acid, while the analysis of whole amount of the electronic grade nitric acid was conducted according to the procedures set forth in SEMI C35-0708 Specification and Guide for Nitric Acid. For each of the electronic grade hydrofluoric acid and the electronic grade nitric acid, the content of each of the metal ions contained therein was determined using an inductively coupled plasma mass spectrometer (ICP-MS) (Manufacturer: Agilent Technologies, Inc; Model no.: Triple Quadrupole 8900); the chloride ion ($Cl^-$) content was determined using a turbidimeter (Manufacturer: Hach Co.; Model no.: TL-2350 EPA); the contents of nitrate ion ($NO_3^-$) and phosphate ion ($PO_4^{3-}$) were determined using the ultraviolet-visible spectrophotometer (Manufacturer: Shimadzu Corporation; Model no.: UV-2600); the sulfate ion ($SO_4^{2-}$) content was determined by ion chromatography (Manufacturer: Metrohm AG; Model no.: 940 Professional IC Vario) and the contents of hydrofluoric acid, nitric acid, ignition residue, fluorosilicic acid ($H_2SiF_6$), and reduced substance were determined using the automatic titrator (Manufacturer: Metrohm AG; Model no.: 848 Titrino plus). The results are shown in Tables 2 and 3 below.

TABLE 1

|  |  | EX1 | EX2 | EX3 |
|---|---|---|---|---|
| Waste acid solution/ waste hydrofluoric acid solution | Hydrofluoric acid (wt %) | 27.2 | 15.5 | 24.7 |
|  | Nitric acid (wt %) | 16.1 | 14.5 | N.D. |
|  | $H_2SiF_6$ (wt %) | 0.06 | 7.4 | 0.02 |
|  | $H_2O$ (wt %) | 56.59 | 62.54 | 75.23 |
|  | Non-volatile acids* (ppm) | N.D. | <100 | N.D. |
|  | Ignition residue (ppm) | <500 | <500 | <500 |
| Feed amount of waste acid solution/waste hydrofluoric acid solution (kg/h) |  | 1000 | 1000 | 1000 |
| Equivalent ratio of NaOH to $H_2SiF_6$ |  | 2.1 | 2.2 | 2.1 |
| Recovery rate of hydrofluoric acid (%) |  | >99 | >99 | >99.5 |
| Recovery rate of nitric acid (%) |  | >95 | >95 | — |

*non-volatile acids include sulfuric acid
"N.D.": not detected
"—": not determined As shown in Table 1, the methods of EX1 and EX2 may achieve a recovery rate of nitric acid that is greater than 95% and a recovery rate of hydrofluoric acid that is greater than 99%, indicating that by subjecting the waste acid solution to steps (A) to (H) of the first embodiment of the method of the present disclosure, nitric acid and hydrofluoric acid can be effectively recovered from the waste acid solution.

In addition, the method of EX3 has a recovery rate of hydrofluoric acid that is greater than 99.5%, indicating that by subjecting the waste acid solution to steps (A) to (C) of the second embodiment of the present disclosure, hydrofluoric acid can be effectively recovered from the waste hydrofluoric acid solution.

TABLE 2

|  | Electronic grade hydrofluoric acid | Standard amount | EX1 | EX2 | EX3 |
|---|---|---|---|---|---|
|  | HF purity (%) | 49 ± 0.5 | 49.11 | 49.05 | 49.18 |
|  | Ignition residue content (ppm) | ≤0.50 | ≤0.50 | ≤0.50 | ≤0.50 |
|  | Reduced substance content (ppm) | ≤0.05 | ≤0.05 | ≤0.05 | ≤0.05 |
|  | $H_2SiF_6$ content (ppm) | ≤0.05 | ≤0.05 | ≤0.05 | ≤0.05 |
|  | $Cl^-$ content (ppm) | ≤0.05 | ≤0.02 | ≤0.02 | ≤0.02 |
|  | $NO_3^-$ content (ppm) | ≤0.10 | ≤0.05 | ≤0.05 | ≤0.05 |
|  | $PC_4^{3-}$ content (ppm) | ≤0.05 | ≤0.02 | ≤0.02 | ≤0.02 |
|  | $SO_4^{2-}$ content (ppm) | ≤0.05 | ≤0.03 | ≤0.05 | ≤0.02 |
| Metal ion content (ppb) | Aluminum (Al) | ≤0.10 | ≤0.10 | ≤0.10 | ≤0.10 |
|  | Antimony (Sb) | ≤0.10 | ≤0.05 | ≤0.10 | ≤0.05 |
|  | Arsenic (As) | ≤0.10 | ≤0.05 | ≤0.10 | ≤0.05 |
|  | Barium (Ba) | ≤0.10 | ≤0.05 | ≤0.10 | ≤0.05 |
|  | Beryllium (Be) | ≤0.10 | ≤0.05 | ≤0.10 | ≤0.05 |
|  | Bismuth (Bi) | ≤0.10 | ≤0.05 | ≤0.10 | ≤0.05 |
|  | Boron (B) | ≤0.20 | ≤0.10 | ≤0.10 | ≤0.10 |

TABLE 2-continued

| Electronic grade hydrofluoric acid | Standard amount | EX1 | EX2 | EX3 |
|---|---|---|---|---|
| Cadmium (Cd) | ≤0.10 | ≤0.05 | ≤0.10 | ≤0.05 |
| Calcium (Ca) | ≤0.20 | ≤0.01 | ≤0.10 | ≤0.05 |
| Chromium (Cr) | ≤0.02 | ≤0.01 | ≤0.10 | ≤0.05 |
| Cobalt (Co) | ≤0.10 | ≤0.05 | ≤0.10 | ≤0.05 |
| Copper (Cu) | ≤0.10 | ≤0.05 | ≤0.10 | ≤0.05 |
| Gallium (Ga) | ≤0.10 | ≤0.05 | ≤0.10 | ≤0.05 |
| Germanium (Ge) | ≤0.10 | ≤0.05 | ≤0.10 | ≤0.05 |
| Iron (Fe) | ≤0.20 | ≤0.10 | ≤0.20 | ≤0.10 |
| Lead (Pb) | ≤0.10 | ≤0.05 | ≤0.01 | ≤0.05 |
| Lithium (Li) | ≤0.10 | ≤0.05 | ≤0.10 | ≤0.05 |
| Magnesium (Mg) | ≤0.10 | ≤0.05 | ≤0.10 | ≤0.05 |
| Manganese (Mn) | ≤0.10 | ≤0.10 | ≤0.10 | ≤0.05 |
| Molybdenum (Mo) | ≤0.10 | ≤0.10 | ≤0.10 | ≤0.05 |
| Nickel (Ni) | ≤0.10 | ≤0.05 | ≤0.10 | ≤0.05 |
| Potassium (K) | ≤0.20 | ≤0.10 | ≤0.20 | ≤0.10 |
| Silver (Ag) | ≤0.10 | ≤0.05 | ≤0.10 | ≤0.05 |
| Sodium (Na) | ≤0.20 | ≤0.10 | ≤0.20 | ≤0.10 |
| Strontium (Sr) | ≤0.10 | ≤0.05 | ≤0.10 | ≤0.05 |
| Tantalum (Ta) | ≤0.10 | ≤0.05 | ≤0.10 | ≤0.05 |
| Thallium (Tl) | ≤0.10 | ≤0.05 | ≤0.10 | ≤0.05 |
| Tin (Sn) | ≤0.10 | ≤0.05 | ≤0.10 | ≤0.05 |
| Titanium (Ti) | ≤0.10 | ≤0.05 | ≤0.10 | ≤0.05 |
| Vanadium (V) | ≤0.10 | ≤0.05 | ≤0.10 | ≤0.05 |
| Zinc (Zn) | ≤0.10 | ≤0.05 | ≤0.10 | ≤0.05 |
| Zirconium (Zr) | ≤0.10 | ≤0.05 | ≤0.10 | ≤0.05 |

TABLE 3

| | Electronic grade nitric acid | Standard amount | EX1 | EX2 | EX3 |
|---|---|---|---|---|---|
| | $HNO_3$ purity (%) | 70 ± 0.5 | 69.8 | 70.05 | N/A |
| | Ignition residue content (ppm) | ≤0.50 | ≤0.50 | ≤0.50 | N/A |
| | $Cl^-$ content (ppm) | ≤0.05 | ≤0.02 | ≤0.02 | N/A |
| | $PO_4^{3-}$ content (ppm) | ≤0.05 | ≤0.03 | ≤0.05 | N/A |
| | $SO_4^{2-}$ content (ppm) | ≤0.05 | ≤0.03 | ≤0.05 | N/A |
| Metal ion content (ppb) | Aluminum (Al) | ≤0.20 | ≤0.10 | N/A | N/A |
| | Antimony (Sb) | ≤0.10 | ≤0.05 | ≤0.10 | N/A |
| | Arsenic (As) | ≤0.10 | ≤0.10 | ≤0.10 | N/A |
| | Barium (Ba) | ≤0.10 | ≤0.05 | ≤0.10 | N/A |
| | Beryllium (Be) | ≤0.10 | ≤0.05 | ≤0.10 | N/A |
| | Bismuth (Bi) | ≤0.10 | ≤0.05 | ≤0.10 | N/A |
| | Boron (B) | ≤0.50 | ≤0.50 | ≤0.50 | N/A |
| | Cadmium (Cd) | ≤0.10 | ≤0.05 | ≤0.10 | N/A |
| | Calcium (Ca) | ≤0.20 | ≤0.05 | ≤0.20 | N/A |
| | Chromium (Cr) | ≤0.20 | ≤0.10 | ≤0.20 | N/A |
| | Cobalt (Co) | ≤0.10 | ≤0.05 | ≤0.10 | N/A |
| | Copper (Cu) | ≤0.10 | ≤0.05 | ≤0.10 | N/A |
| | Gallium (Ga) | ≤0.10 | ≤0.05 | ≤0.10 | N/A |
| | Germanium (Ge) | ≤0.10 | ≤0.05 | ≤0.10 | N/A |
| | Iron (Fe) | ≤0.50 | ≤0.20 | ≤0.30 | N/A |
| | Lead (Pb) | ≤0.10 | ≤0.05 | ≤0.10 | N/A |
| | Lithium (Li) | ≤0.10 | ≤0.05 | ≤0.10 | N/A |
| | Magnesium (Mg) | ≤0.20 | ≤0.10 | ≤0.20 | N/A |
| | Manganese (Mn) | ≤0.10 | ≤0.05 | ≤0.10 | N/A |
| | Molybdenum (Mo) | ≤0.10 | ≤0.05 | ≤0.10 | N/A |
| | Nickel (Ni) | ≤0.10 | ≤0.05 | ≤0.10 | N/A |
| | Potassium (K) | ≤0.20 | ≤0.10 | ≤0.20 | N/A |
| | Silver (Ag) | ≤0.10 | ≤0.05 | ≤0.10 | N/A |
| | Sodium (Na) | ≤0.20 | ≤0.10 | ≤0.20 | N/A |
| | Strontium (Sr) | ≤0.10 | ≤0.05 | ≤0.10 | N/A |
| | Tantalum (Ta) | ≤0.10 | ≤0.05 | ≤0.10 | N/A |
| | Thallium (Tl) | ≤0.10 | ≤0.05 | ≤0.10 | N/A |
| | Tin (Sn) | ≤0.10 | ≤0.05 | ≤0.10 | N/A |
| | Titanium (Ti) | ≤0.10 | ≤0.05 | ≤0.10 | N/A |
| | Vanadium (V) | ≤0.10 | ≤0.05 | ≤0.10 | N/A |
| | Zinc (Zn) | ≤0.10 | ≤0.05 | ≤0.10 | N/A |
| | Zirconium (Zr) | ≤0.10 | ≤0.05 | ≤0.10 | N/A |

"N/A": not available

It can be seen from Tables 2 and 3 that, the electronic grade hydrofluoric acid and the electronic grade nitric acid obtained in each of the methods of EX1 and EX2 meet the purity standard required by the semiconductor industry, indicating that by subjecting the waste acid solution to steps (A) to (H) of the first embodiment of the method of the present disclosure, hydrofluoric acid and nitric acid in the waste acid solution can be effectively recovered and regenerated to obtain the electronic grade hydrofluoric acid and the electronic grade nitric acid that are particularly suitable for recycle use in the manufacturing process of high-tech electronics industry, such as the manufacturing process of semiconductors, solar cells, etc.

In addition, referring again to the results shown in Table 2, the electronic grade hydrofluoric acid obtained in the method of EX3 also meets the purity standard required by the semiconductor industry, indicating that by subjecting the waste hydrofluoric acid solution to steps (A) to (C) of the second embodiment of the method of the present disclosure, hydrofluoric acid in the waste hydrofluoric acid solution can be effectively recovered and regenerated to obtain the electronic grade hydrofluoric acid, which is particularly suitable for recycle use in the manufacturing process of high-tech electronics industry, such as the manufacturing process of semiconductors, solar cells, etc.

In summary, by subjecting the waste acid solution produced from the manufacturing process of high-tech electronics industry as a raw material to the method of the present disclosure, not only the thus obtained electronic grade hydrofluoric acid and electronic grade nitric acid meet the purity standards required by the semiconductor industry, but also recycling of the waste acid solution can be achieved, thereby significantly contributing to waste reduction and environmental protection.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for preparing electronic grade inorganic acids from a waste acid solution containing hydrofluoric acid, nitric acid and water, comprising the steps of:
   (A) introducing alkali metal salts containing an alkali metal fluoride salt and an alkali metal nitrate salt into the waste acid solution to break azeotrope of hydrofluoric acid and water, the alkali metal salts being present in a molar amount ranging from 20 mol % to 40 mol % based on a total molar amount of the alkali metal salts, hydrofluoric acid, nitric acid and water of the waste acid solution, and then performing a first distillation treatment in a vacuum environment to obtain a hydrogen fluoride vapor that is entrained with mist droplets containing impurities, and a first distillation residue mixture containing nitric acid, water, the alkali metal fluoride salt and the alkali metal nitrate salt;

(B) removing the mist droplets containing impurities entrained in the hydrogen fluoride vapor so as to obtain a purified hydrogen fluoride vapor;

(C) subjecting the purified hydrogen fluoride vapor to a first condensation treatment, followed by concentration adjustment using ultrapure water so as to obtain an electronic grade hydrofluoric acid having a purity of 49±0.5%;

(D) subjecting the first distillation residue mixture obtained in step (A) to a first evaporation treatment in a vacuum environment, such that partial water and nitric acid are evaporated therefrom to form a nitric acid/water mixture, and such that the alkali metal fluoride salt, the alkali metal nitrate salt, and yet-to-be evaporated water are concentrated to form a concentrated solution of the alkali metal salts which is then subjected back to the first distillation treatment of step (A) so as to be recycled;

(E) introducing an alkali earth metal nitrate salt into the nitric acid/water mixture obtained in step (D) so as to break azeotrope of nitric acid and water, and then performing a second distillation treatment in a vacuum environment to obtain a nitric acid vapor that is entrained with mist droplets containing impurities, and a second distillation residue that is an alkali earth metal nitrate solution containing the alkali earth metal nitrate salt and water;

(F) removing the mist droplets containing impurities entrained in the nitric acid vapor so as to obtain a purified nitric acid vapor;

(G) subjecting the purified nitric acid vapor to a second condensation treatment, followed by concentration adjustment using ultrapure water so as to obtain an electronic grade nitric acid having a purity of 70±0.5%; and (H) subjecting the alkali earth metal nitrate solution obtained in step (E) to a second evaporation treatment, such that partial water is evaporated therefrom to form a concentrated alkali earth metal nitrate solution which is then subjected back to the second distillation treatment of step (E) so as to be recycled, wherein in step (A), the alkali metal fluoride salt is selected from the group consisting of lithium fluoride, potassium fluoride, cesium fluoride, and combinations thereof, the alkali metal nitrate salt is selected from the group consisting of lithium nitrate, potassium nitrate, cesium nitrate, and combinations thereof, a molar ratio of the alkali metal fluoride salt to the alkali metal nitrate salt ranges from 0.05:1 to 10:1, the vacuum environment has a pressure ranging from 100 mmHg to 500 mmHg, and the first distillation treatment is performed in a first distillation tower that includes a polytetrafluoroethylene lining, a bottom portion set at a temperature ranging from 80° C. to 130° C., and a top portion opposite to the bottom portion and set at a temperature ranging from 50° C. to 100° C.

2. The method as claimed in claim 1, wherein in step (A), a reflux ratio of the first distillation tower ranges from 0.5 to 3.

3. The method as claimed in claim 1, wherein in step (D), the first evaporation treatment is conducted at a temperature ranging from 130° C. to 180° C.

4. The method as claimed in claim 1, wherein in step (E), the alkali earth metal nitrate salt is selected from the group consisting of magnesium nitrate, calcium nitrate, and a combination thereof, and based on a total molar amount of the alkali earth metal nitrate salt, and of nitric acid and water in the nitric acid/water mixture, the alkali earth metal nitrate salt is present in an amount ranging from 40 mol % to 65 mol %.

5. The method as claimed in claim 1, wherein in step (E), the vacuum environment has a pressure ranging from 100 mmHg to 500 mmHg.

6. The method as claimed in claim 1, wherein in step (E), the second distillation treatment is performed in a second distillation tower that includes a polytetrafluoroethylene lining, a bottom portion set at a temperature ranging from 120° C. to 140° C., and an upper portion opposite to the bottom portion and set at a temperature ranging from 70° C. to 100° C.

7. The method as claimed in claim 6, wherein a reflux ratio of the second distillation tower ranges from 0.5 to 3.

8. The method as claimed in claim 1, wherein in step (H), the second evaporation treatment is conducted at a temperature ranging from 130° C. to 180° C.

9. The method as claimed in claim 1, wherein the waste acid solution further contains fluorosilicic acid, and the method further comprising, before step (A), a step of introducing sodium hydroxide into the the waste acid solution to form sodium fluorosilicate, followed by removal of sodium fluorosilicate.

10. A method for preparing an electronic grade hydrofluoric acid from a waste hydrofluoric acid solution containing water and hydrofluoric acid, comprising the steps of:

(A) introducing alkali metal salts containing an alkali metal fluoride salt and an alkali metal nitrate salt into the waste hydrofluoric acid solution to break azeotrope of hydrofluoric acid and water, the alkali metal salts being present in a molar amount ranging from 20 mol % to 40 mol % based on a total molar amount of the alkali metal salts, hydrofluoric acid and water in the waste hydrofluoric acid solution, and then performing a distillation treatment in a vacuum environment to obtain a hydrogen fluoride vapor that is entrained with mist droplets containing impurities;

(B) removing the mist droplets containing impurities entrained in the hydrogen fluoride vapor so as to obtain a purified hydrogen fluoride vapor; and (C) subjecting the purified hydrogen fluoride vapor to a condensation treatment, followed by concentration adjustment using ultrapure water so as to obtain an electronic grade hydrofluoric acid having a purity of 49±0.5%, wherein in step (A), the alkali metal fluoride salt is selected from the group consisting of lithium fluoride, potassium fluoride, cesium fluoride, and combinations thereof, the alkali metal nitrate salt is selected from the group consisting of lithium nitrate, potassium nitrate, cesium nitrate, and combinations thereof, a molar ratio of the alkali metal fluoride salt to the alkali metal nitrate salt ranges from 0.05:1 to 10:1, the vacuum environment has a pressure ranging from 100 mmHg to 500 mmHg, and the distillation treatment is performed in a distillation tower that includes a polytetrafluoroethylene lining, a bottom portion set at a temperature ranging from 80° C. to 130° C., and a top portion opposite to the bottom portion and set at a temperature ranging from 50° C. to 100° C.

11. The method as claimed in claim 10, wherein a reflux ratio of the distillation tower ranges from 0.5 to 3.

* * * * *